(12) United States Patent
Schaefer et al.

(10) Patent No.: US 12,481,836 B2
(45) Date of Patent: Nov. 25, 2025

(54) CONVERSATIONAL UNIT TEST GENERATION USING LARGE LANGUAGE MODEL

(71) Applicant: MICROSOFT TECHNOLOGY LICENSING, LLC., Redmond, WA (US)

(72) Inventors: Max Schaefer, Kidlington (GB); Albert Ziegler, Uppsala (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 18/198,754

(22) Filed: May 17, 2023

(65) Prior Publication Data

US 2024/0311582 A1 Sep. 19, 2024

Related U.S. Application Data

(60) Provisional application No. 63/452,671, filed on Mar. 16, 2023.

(51) Int. Cl.
| | |
|---|---|
| *G06F 40/40* | (2020.01) |
| *G06F 11/3604* | (2025.01) |
| *G06F 11/3668* | (2025.01) |
| *G06F 40/35* | (2020.01) |
| *G06N 5/022* | (2023.01) |

(52) U.S. Cl.
CPC .......... *G06F 40/40* (2020.01); *G06F 11/3608* (2013.01); *G06F 11/3684* (2013.01); *G06F 40/35* (2020.01); *G06N 5/022* (2013.01)

(58) Field of Classification Search
None
See application file for complete search history.

(56) References Cited

U.S. PATENT DOCUMENTS

| | | | |
|---|---|---|---|
| 10,678,678 B1 * | 6/2020 | Tsoukalas | G06F 11/368 |
| 11,645,479 B1 * | 5/2023 | Coursey | G06F 40/58 |
| | | | 704/9 |
| 2011/0161936 A1 * | 6/2011 | Huang | G06F 11/3688 |
| | | | 717/130 |

(Continued)

OTHER PUBLICATIONS

S. Kang, J. Yoon and S. Yoo, "Large Language Models are Few-shot Testers: Exploring LLM-based General Bug Reproduction," Sep. 23, 2022, arXiv:2209.11515v1 [cs.SE], last retrieved from https://arxiv.org/pdf/2209.11515v1 on Mar. 15, 2025. (Year: 2022).*

(Continued)

*Primary Examiner* — Andrew M. Lyons
(74) *Attorney, Agent, or Firm* — Workman Nydegger

(57) ABSTRACT

A large language model, trained on source code and natural language text generates a unit test for a change to a file in a pull request of a code repository. An ordered sequence of prompts is created and each is applied serially to the large language model to perform an individual task that leads to the generation of the unit test. The unit test may be added to an existing file or generated as a newly-created file. Each prompt includes the data from a previously-issued prompt of the ordered sequence in order for the model to retain contextual knowledge learned previously. The model generates the unit test as update commands when the unit test is added to an existing file.

20 Claims, 7 Drawing Sheets

(56) References Cited

U.S. PATENT DOCUMENTS

| | | | |
|---|---|---|---|
| 2018/0196731 A1 | 7/2018 | Moorthi | |
| 2023/0418730 A1* | 12/2023 | Kumar | G06F 11/3684 |
| 2024/0134783 A1* | 4/2024 | Yagami | G06F 11/3688 |
| 2024/0256423 A1* | 8/2024 | Zhang | G06F 8/71 |
| 2024/0283820 A1* | 8/2024 | Kochman | G06N 3/045 |

OTHER PUBLICATIONS

M. Tufano, D. Drain, A. Svyatkovskiy, S.K. Deng and N. Sundaresan, "Unit Test Case Generation with Transformers and Focal Context," May 20, 2021, arXiv:2009.05617v2 [cs.SE], last retrieved from https://arxiv.org/pdf/2009.05617 on Jul. 11, 2025. (Year: 2021).*

International Search Report and Written Opinion received for PCT Application No. PCT/US2024/018758, Jun. 19, 2024, 16 pages.

Rice, et al., "Copilot for Pull Requests", Retrieved from: https://githubnext.com/projects/copilot-for-pull-requests/, Retrieved Date: Feb. 28, 2023, 13 Pages.

Schaefer, et al., "TestPilot", Retrieved from: https://githubnext.com/projects/testpilot, Retrieved Date: Feb. 28, 2023, 6 Pages.

International Preliminary Report on Patentability (Chapter I) received for PCT Application No. PCT/US2024/018758, mailed on Sep. 25, 2025, 11 pages.

\* cited by examiner

CONVERSATIONAL UNIT TEST GENERATION USING LARGE LANGUAGE MODEL

CROSS-REFERENCE TO RELATED APPLICATIONS

The present application claims the benefit of the earlier filed provisional application having Ser. No. 63/452,671 filed on Mar. 16, 2023, entitled "Conversational AI Test Generation", which is incorporated by reference in its entirety.

BACKGROUND

A version-controlled code repository stores each version of an artifact, such as a source code file, test file, documentation file, etc. and tracks the changes between the different versions. Repositories managed by a version-control system are distributed so that each user of the repository has a working copy of the repository. The version-control system coordinates the distribution of the changes made to the contents of the repository to the different users.

When the user is finished with editing a file, the user performs a commit which checks in the modified version of the file back into a shared code repository. A pull request informs others that changes have been made to the file which were pushed or committed back into the code repository.

A common practice is for the changes to be tested prior to being submitted and for the tests to be included in the pull request. However, at times, the developer may not have tested the change or the test may not sufficiently test all changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A conversational unit test generation system generates unit tests for a change from a pull request of a code repository. A large language model is used to predict the location of the unit tests in either an existing file or a new file and the content of the unit tests. The test generation is performed in a series of steps, where in each step, the large language model performs a specific task given a prompt. The tasks start from determining whether the change in a pull request is testworthy, to determining the location of the file where the added tests are to be placed in a repository when the change is testworthy, and to the generation of the unit tests.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to the generation of unit tests for a change in a pull request of a code repository. A large language model predicts where to place the unit tests in either an existing file or a new file and the contents of the unit tests. The test generation is performed in a series of steps where in each step the large language model performs a specific task given a prompt.

The large language model receives a prompt at each step that includes instructions on the task to be performed which is posed as a question with an answer format. Each preceding prompt and response are added to the current prompt in order for the model to retain the entire context since the large language model does not save context information from previous questions. The model provides an answer to each prompt. The question of each prompt is stored in a conversation stack and used in the following prompt, if any. The last answer provides the contents of the unit tests either as a new file or as edits to an existing file.

Attention now turns to a system, device, and method of the unit test generation system.

System

Figure 1:
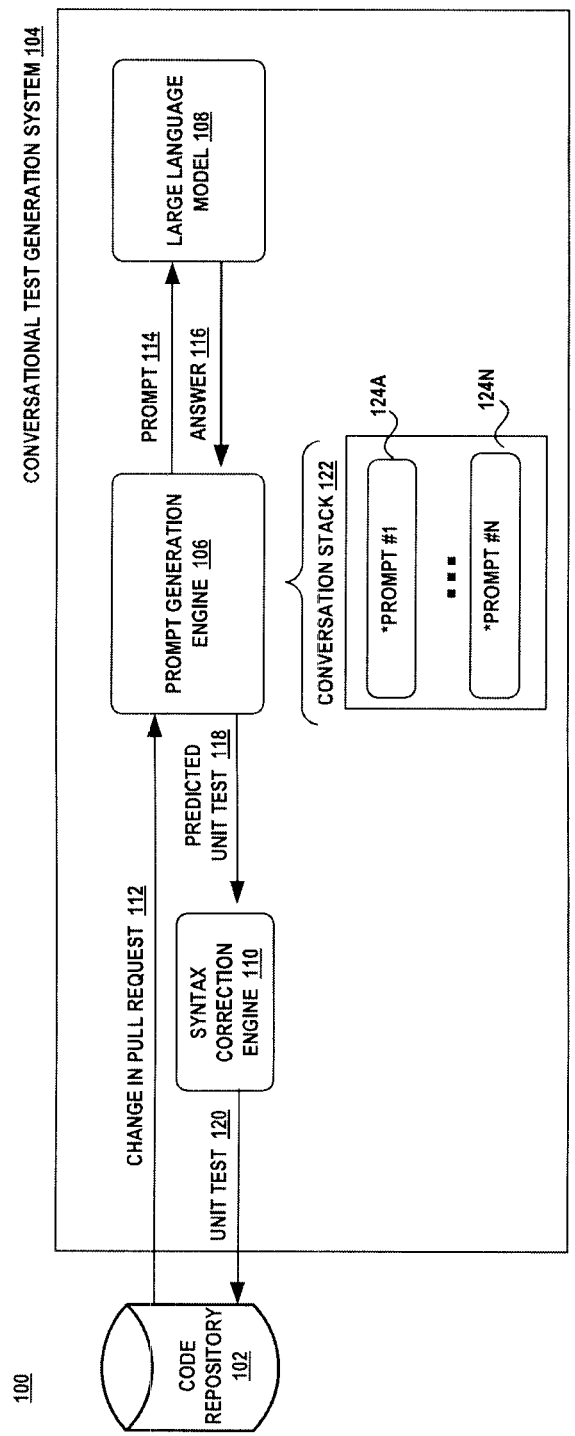
FIG. 1 illustrates an exemplary conversational test generation system using a large language model.

FIG. 1 represents an exemplary system 100 for a conversational unit test generation. The system includes a code repository 102 and a conversational test generation system 104. A code repository 102 may be a file archive and web hosting facility that stores large amounts of software development assets, such as, without limitation, source code files, unit tests, script files, documentation, etc., either privately or publicly. The code repository 102 is a shared repository managed by a version-control system that coordinates the distribution of the changes made to the contents of the code repository to different users.

The conversational test generation system 104 interacts with the code repository 102 to detect changes in a pull request needing a unit test. The conversational test generation system 104 generates the unit tests using a large language model 108. In an aspect, the conversational test generation system 104 may be part of a version-control system of the code repository, such as an extension or add-on component. Alternatively, the conversational test generation system 104 may be a separate application or service that interacts with the code repository through application programming interfaces or the like.

There are a variety of tests that may be applied to changes of a program, such as without limitation, a unit test, an integration test, a regression test, an acceptance test, a smoke test, and a security test. A unit test is a way of testing a smallest unit of code that can be logically isolated in a program. An integration test is a way of testing a set of software modules as a group. A smoke test is a way to test the overall functionality of a program. Regression testing re-runs functional and non-functional tests after changes to ensure that the program behaves as intended. Acceptance testing ensures that the business requirements of an end-user are met. In an aspect, the changes of a pull request are tested using unit tests.

The conversational test generation system 104 includes a prompt generation engine 106, a large language model 108, a syntax correction engine 110, and a conversation stack 122. The prompt generation engine 106 scans each pull request uploaded to the code repository 102 for changes 112.

The prompt generation engine 106 generates a conversation with the large language model in the form of a prompt or ordered sequence of prompts to generate the unit tests. A prompt 114 includes a question which may include an answer format. Each prompt contains the preceding prompt in order to maintain the context of the conversation. A conversation stack 122 stores each generated prompt 124a-124n.

In the final prompt, the large language model predicts the contents of the unit tests 118 which is sent to the syntax correction engine 110 to correct any syntax errors. The syntactically-correct unit tests 120 are then stored in the code repository 102.

In an aspect, the large language model 108 is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention. In an aspect, the large language model is configured as an encoder-decoder neural transformer model with attention and in another aspect, the large language model is configured as a decoder neural transformer model with attention. The encoder-decoder neural transformer model with attention consists of a series of stacked encoder blocks coupled to a series of stacked decoder blocks. The encoder blocks extract features from an input sequence to generate embeddings for each token in the input sequence, and the decoder uses the features to produce an output sentence representing code candidates. The decoder neural transformer model with attention consists of a series of stacked decoder blocks.

The large language model is pre-trained on natural language text and source code. Examples of the neural transformer models with attention include OpenAI's GPT models and OpenAI's Codex model. In an aspect, the large language model is hosted on an external server and accessed over a network through application programming interfaces (API). The training of a large language model requires a considerable amount of training data and computing resources which makes it impossible for some developers to create their own models. Instead, third-parties having created a large language model may offer access to the large language model as a cloud service to developers with or without a fee.

A context window is the number of tokens that the large language model can process in a forward pass. The tokens represent the natural language text and source code contained in the prompt. The size of a context window varies and may include 4096 tokens, such as with OpenAI's Codex to 32,000 tokens for OpenAI's GPT-4 model. The prompt is constrained by the size of the context window of the large language model.

Figure 2:
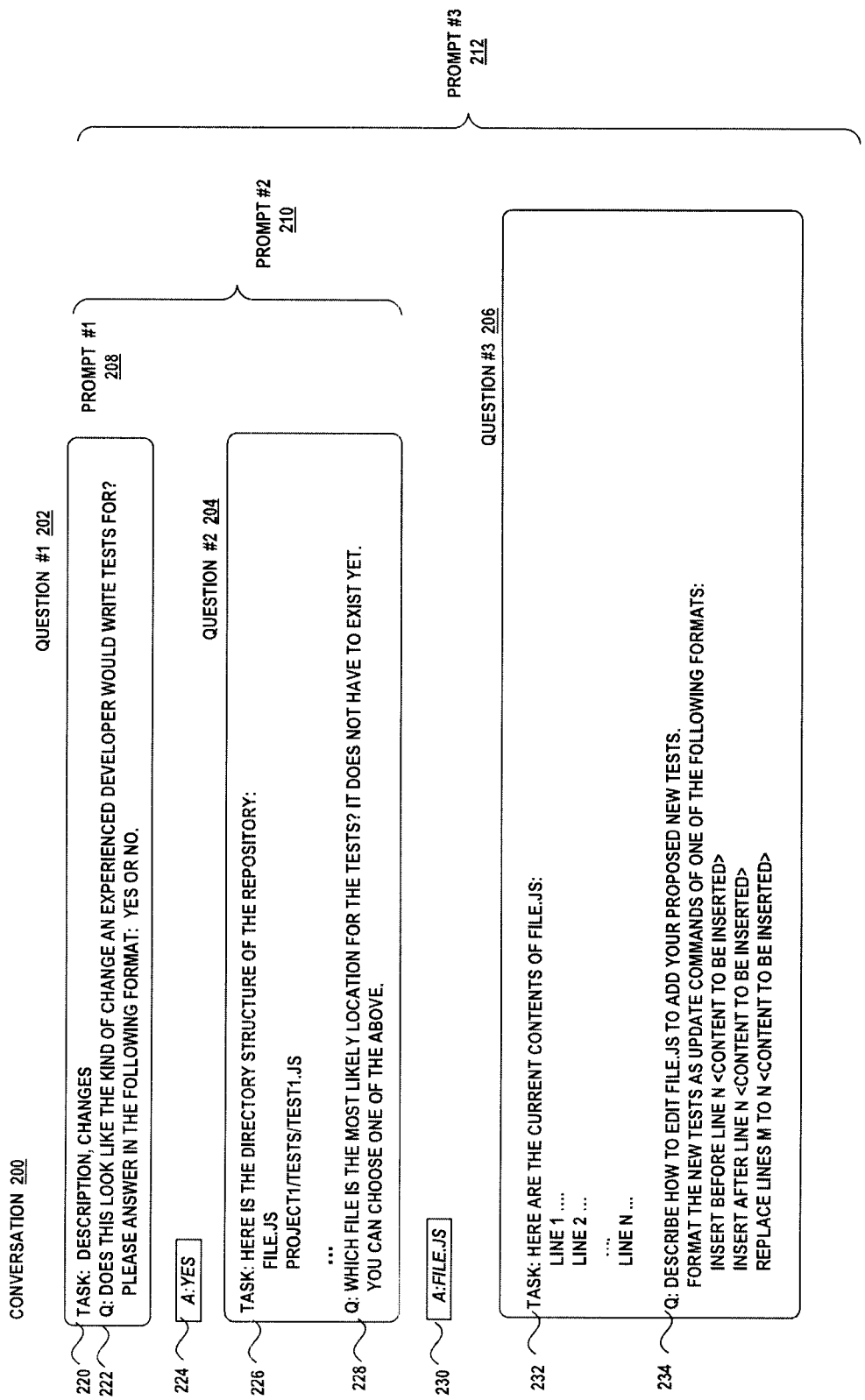
FIG. 2 illustrates an exemplary conversation with a large language model to have the large language model generate edits that add tests into an existing file.

FIG. 2 is an illustration of an exemplary conversation with the large language model for the generation of unit tests to test changes in a pull request. A conversation is an ordered sequence of related prompts made to the large language model to achieve a desired outcome. The conversation 200 includes three prompts with each prompt including a question that relates to the generation of the edits that add the unit tests to an existing file. The first prompt 208 contains Question #1 202 which contains a description of the task and the changes from the pull request 220. Question #1 202 includes a question that asks if the change is testworthy 222 and includes a format of the answer. The large language model responds with a "Yes" answer 224.

The next prompt, prompt #2 210, includes Question #2 204 and prompt #1 208. Question #2 204 contains a description of the task and the structure of the repository associated with the changed file 226 and a question that asks the model where to place the tests given the directory structure with an answer format 228. The large language model responds with FILE.JS 230.

The next prompt, prompt #3 212, includes Question #3 206 and Prompt #2 210 which contains Prompt #1 208. Question #3 206 includes the contents of FILE.JS as the task 232 and a question that asks the model to Describe How To Edit FILE.JS To Add Your Proposed New Tests 234. Annotated line numbers are added to FILE.JS. The question includes an answer format using the following update commands:

Insert Before Line N<Content To Be Inserted>
Insert After Line N<Content To Be Inserted>
Replace Lines M to N<Content To Be Inserted>
The large language model responds with the edits.

Figure 3:
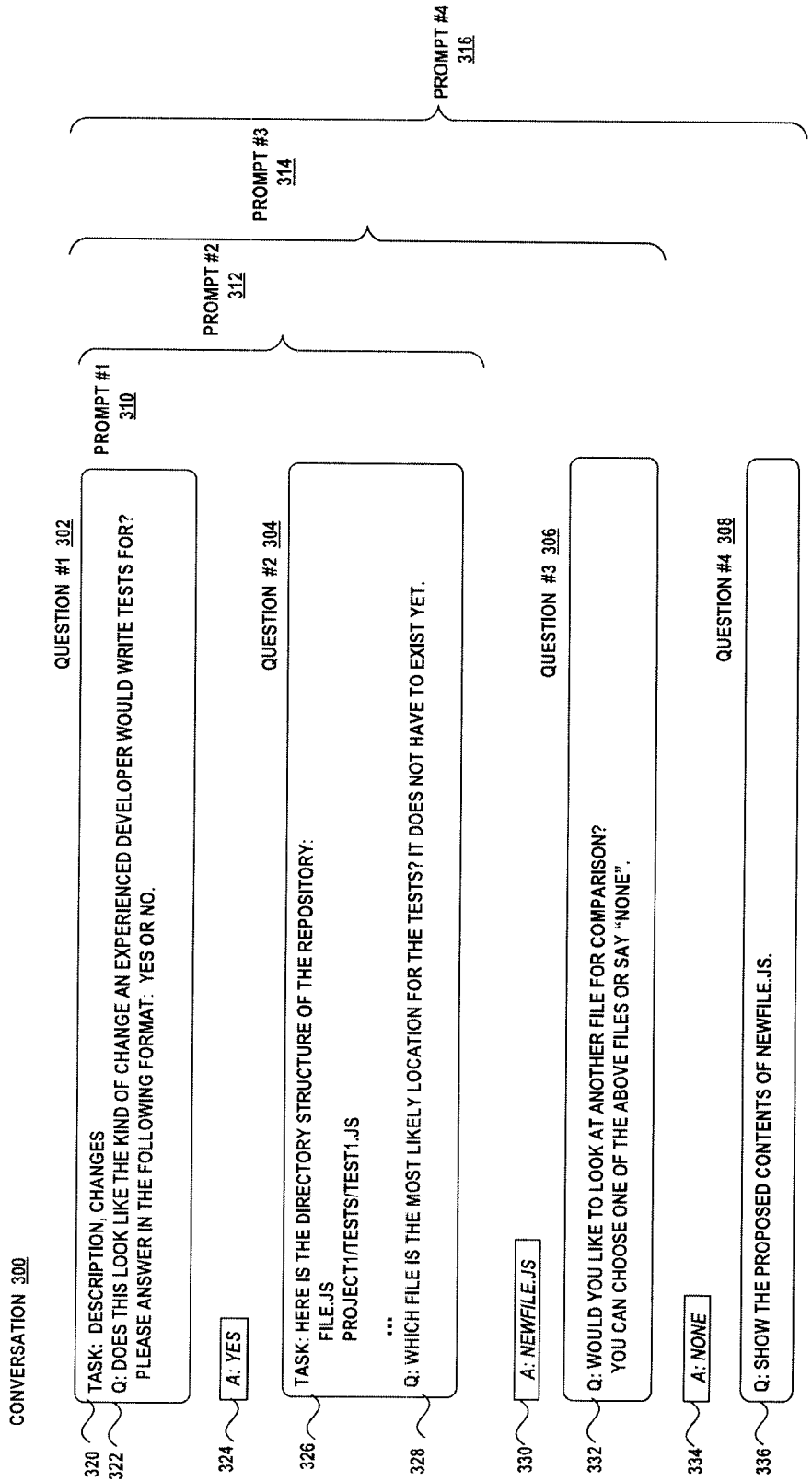
FIG. 3 illustrates an exemplary conversation with a large language model to have the large language model generate a new test file.

FIG. 3 is an illustration of an exemplary conversation with the large language model for the generation of new file having unit tests to test the changes in a pull request. The conversation 300 includes four prompts with each prompt including a question that relates to the generation of the contents of a new file with unit tests. The first prompt 310 contains Question #1 302 which contains a description of the task and the changes from the pull request 320 and a question that asks if the change is testworthy with a format of the answer 322. The large language model responds with a 'Yes' answer 324.

The next prompt, prompt #2 312, includes Question #2 304 and Prompt #1 310. Question #2 304 contains a description of the task and the structure of the repository associated with the changed file 326 and a question that asks the model where to place the tests given the directory structure 328. The large language model responds with NEWFILE.JS 330 indicating that a new file needs to be created with the tests.

The next prompt, prompt #3 314, includes Question #3 306 and Prompt #2 312. Question #3 306 includes a question that asks Would You Like to Look At Another File For Comparison 332 with an answer format that allows the model to choose one of the files in the repository or "None". The model responds with the answer "None" 334.

The last prompt, prompt #4 316, includes Question #4 308 and Prompt #3 314. Question #4 308 includes the question, Show The Proposed Contents of The NEWFILE.JS With The New Tests 336. The large language model responds with the unit tests in the new file.

Figure 4:
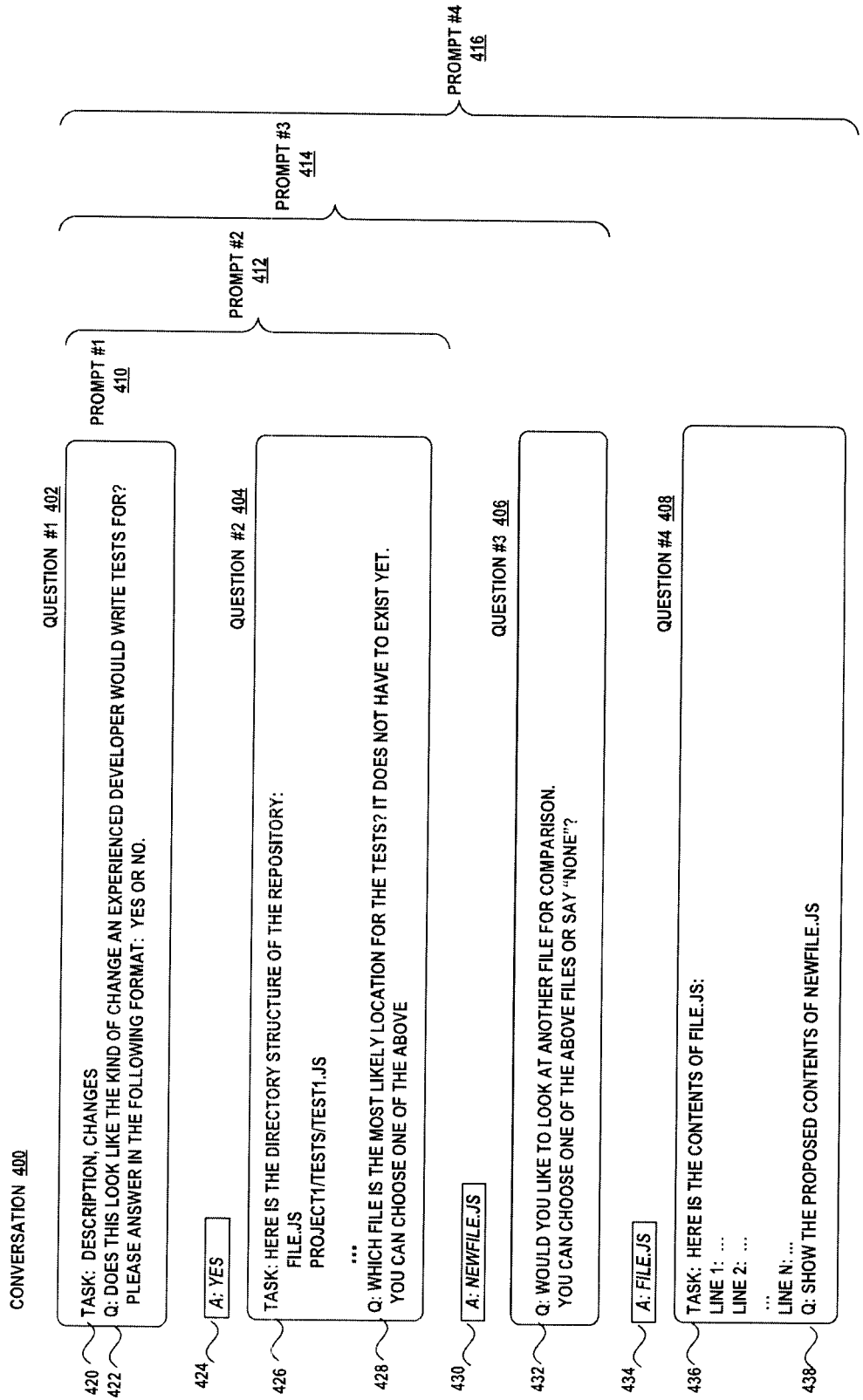
FIG. 4 illustrates an exemplary conversation with a large language model to have the large language model generate a new test file given a comparison file.

FIG. 4 is an illustration of an exemplary conversation with the large language model for the generation of new file having unit tests to test changes in a pull request where the new file is similar to an existing file in the repository. The conversation 400 includes four prompts with each prompt including a question that relates to the edits to an existing file to add unit tests. The first prompt 410 contains Question #1 402 which contains a description of the task and the changes from the pull request 420 and a question that asks if the change is testworthy 422 with a format of the answer. The large language model responds with a 'Yes" answer 424.

The next prompt, prompt #2 412, includes Question #2 404 and Prompt #1 410. Question #2 404 contains a description of the task and the structure of the repository associated with the changed file 426, and a question that asks the model where to place the tests given the directory structure with an answer format 428. The large language model responds with NEWFILE.JS 430.

The next prompt, Prompt #3 414, includes Question #3 406 and Prompt #2 412. Question #3 406 includes a question that asks, Would You Like to Look At Another File For Comparison 432 with an answer format that allows the model to choose one of the files in the repository or "None." The model responds with the answer FILE.JS 434.

The last prompt, Prompt #4 416, includes Question #4 408 and Prompt #3 414. Question #4 408 includes the task 436 which describes the contents of FILE.JS with each line annotated with a line number. A question 438 instructs the large language model to Show The Proposed Contents of The NEWFILE.JS. The large language model responds with the contents of the new file.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5A:
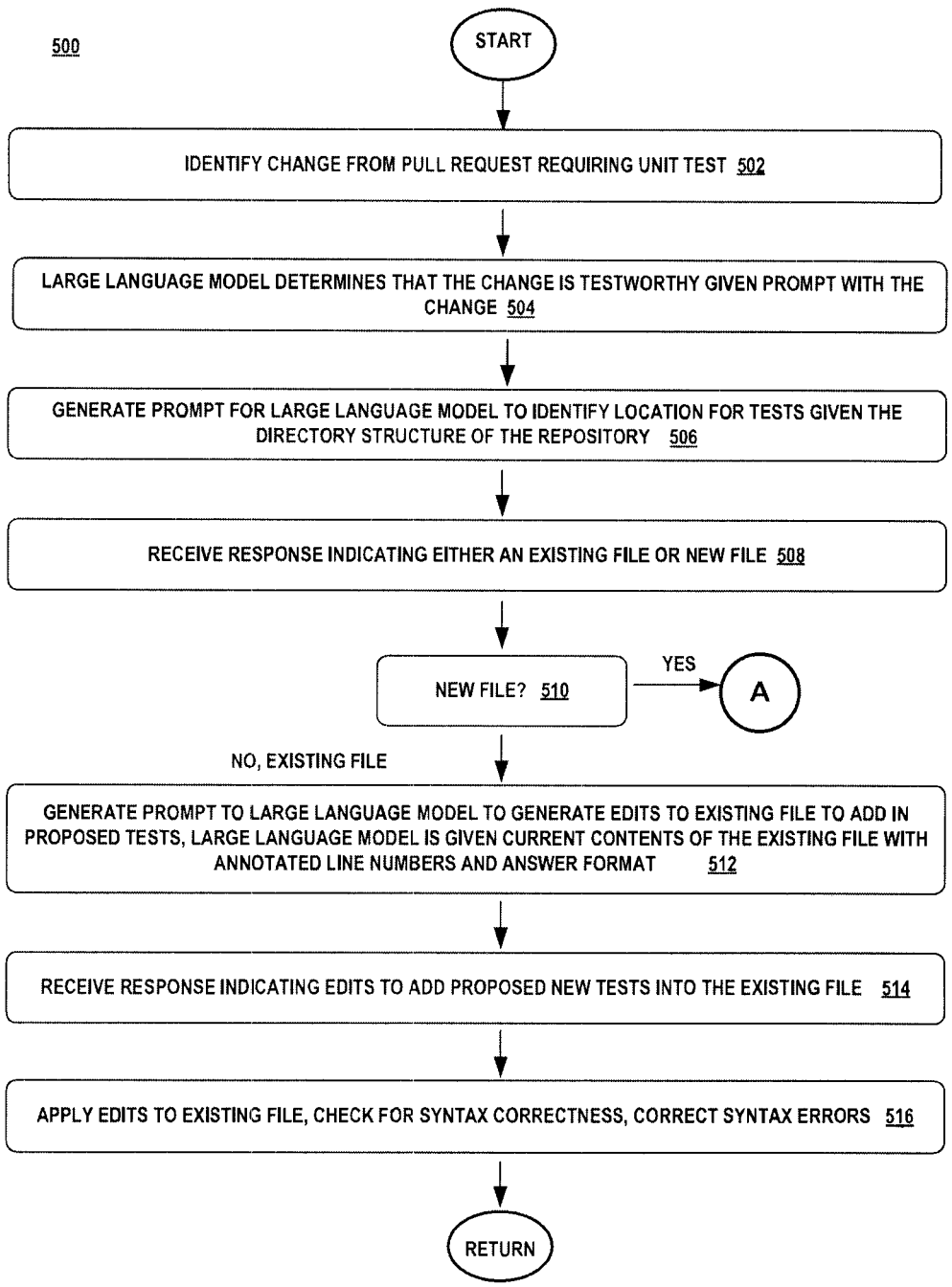
FIGS. 5A-5B are flow charts illustrating an exemplary method of generating conversations with a large language model to generate tests for a change in a pull request.
Figure 5B:
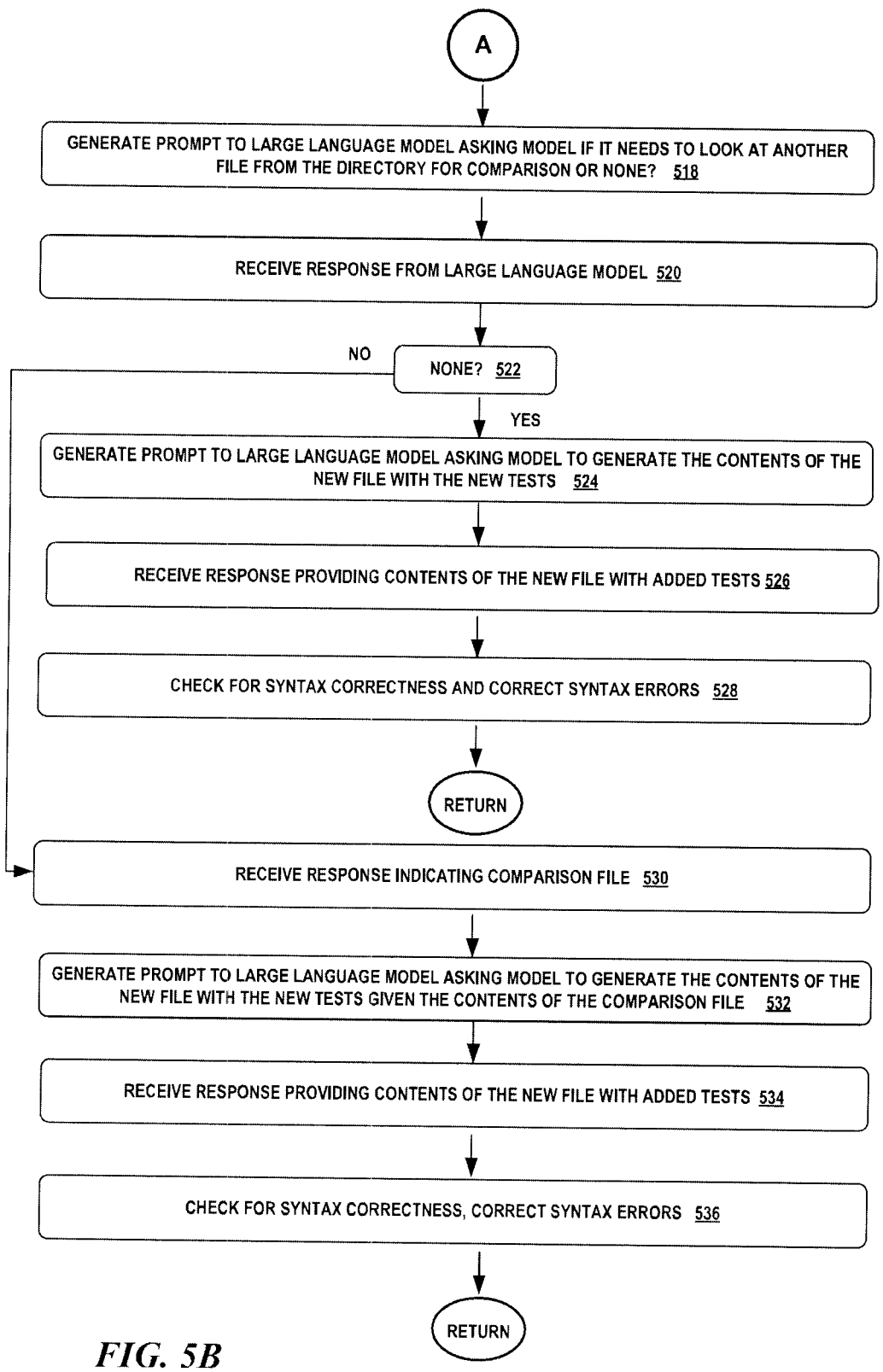

FIGS. 5A-5B are flow charts of a method 500 for generating unit tests for a testworthy change in a pull request using a large language model. Referring to FIGS. 1, 5A and 5B, the pull request engine 106 detects a pull request submitted to the code repository 102 (block 502). The pull request 104 includes one or more changes to a file of the code repository 102.

The prompt generation engine 106 generates a conversation with the large language model 108 that starts with a prompt that asks the large language model to determine if the change is testworthy (block 504). The large language model 108 returns with a response that indicates that the test is testworthy (block 504).

Testworthiness indicates that the change needs to be tested. Not all changes in a pull request need to be tested. Small changes, changes that are difficult to test, changes that are incidental to the functionality to the code, such as changes to code comments or code formatting changes, or changes that affect a command-line interface do not need added tests. Software bug fixes should be tested in order to ensure that the bug does not occur again.

The prompt generation engine 106 then proceeds to generate a prompt for the large language model 108 to determine where the tests should be placed in the repository, such as in an existing file or a new file (block 506). For changes to a file f in a directory d, the prompt shows the files most relevant to the changed file f. The directory d is shown along with the parent directory of d, subdirectories of d, and other directories in the repository where the path of the directory contains the word "test."

In an aspect, the files in the various directories and the directories may be assigned a priority value indicating the importance of a file and directory to the changed file f. In the event the prompt exceeds the context window size of the large language model 108 then the structure of the repository may contain higher priority files with lower priority files replaced with a replacement string.

The large language model 108 returns a response that indicates the location where the unit test should be added (block 508). The response indicates a new file or an existing file which the model predicts from the repository structure given to the model.

If the model 108 predicts an existing file as the location for the tests (block 510—no), then the prompt generation engine 106 generates a prompt to the large language model asking the model to generate the edits to the existing file that add the tests (block 512). The prompt includes the contents of the existing file with each line annotated with a line number. The prompt also includes an answer format that includes update commands that the model uses to describe the changes.

In an aspect, the update commands include the following:
INSERT BEFORE LINE n <CONTENT TO BE INSERTED>
INSERT AFTER LINE n <CONTENT TO BE INSERTED>
REPLACE LINES m TO n WITH <CONTENT TO BE INSERTED>

The answer format instructing the model to describe the edits to the existing file for the tests with the update commands strikes a balance between flexibility and compactness. Asking the model to show the entire contents of the existing file with the added tests may not work if the file is very large due to the constraints on the context window size. Asking the model to describe the changes in a diff format has the advantage of being compact. However, in practice the model may not keep to the format and produce edits that cannot be interpreted correctly. The update commands are a better format for producing the edits.

The prompt generation engine 106 receives the update commands from the large language model (block 514) and applies the update commands to the existing file (block 516). The file is checked for syntactic correctness and any detected syntax errors are corrected (block 516).

In the event the large language model 108 predicts that the added tests should be placed in a new file (block 510—yes), then the prompt generation engine 106 generates a prompt asking the large language model 108 if the model needs to see another file (block 518). This is offered to guide the model on how a test file is constructed. The model may respond with the name of a file from the repository structure already presented to the model or the model may decline the offer (block 520).

If the model 108 responds by not wanting to see a comparison file (block 522—yes), then the prompt generation engine generates a prompt asking the model to generate the contents of the new file with the added tests (block 524). The large language model 108 responds with the new test file (block 526). The syntax correction engine 110 checks the new test file for syntax errors and corrects the syntax errors (block 528) before placing the new test file in the code repository 102.

If the model 108 responds by requesting a comparison file (block 522—no), then the prompt generation engine 106 generates a prompt to the large language model 108 asking the model to generate the contents of the new file and provides the comparison file (block 532). The model 108 returns the contents of the new file (block 534). The syntax correction engine checks the new test file for syntax errors and corrects the syntax errors (block 536) before placing the new test file in the code repository 102 (block 538).

It should be noted that each question of a prompt and associated response is saved onto the conversation stack 122 and used in subsequent prompts. Additionally, the size of the prompts has to fit within the context window size of the large language model. The input into the prompt may be prioritized in order to include high-priority data into the prompt while replacing lower-priority data with a replacement string in order for the prompt to fit within the context window size.

Exemplary Operating Environment

Figure 6:
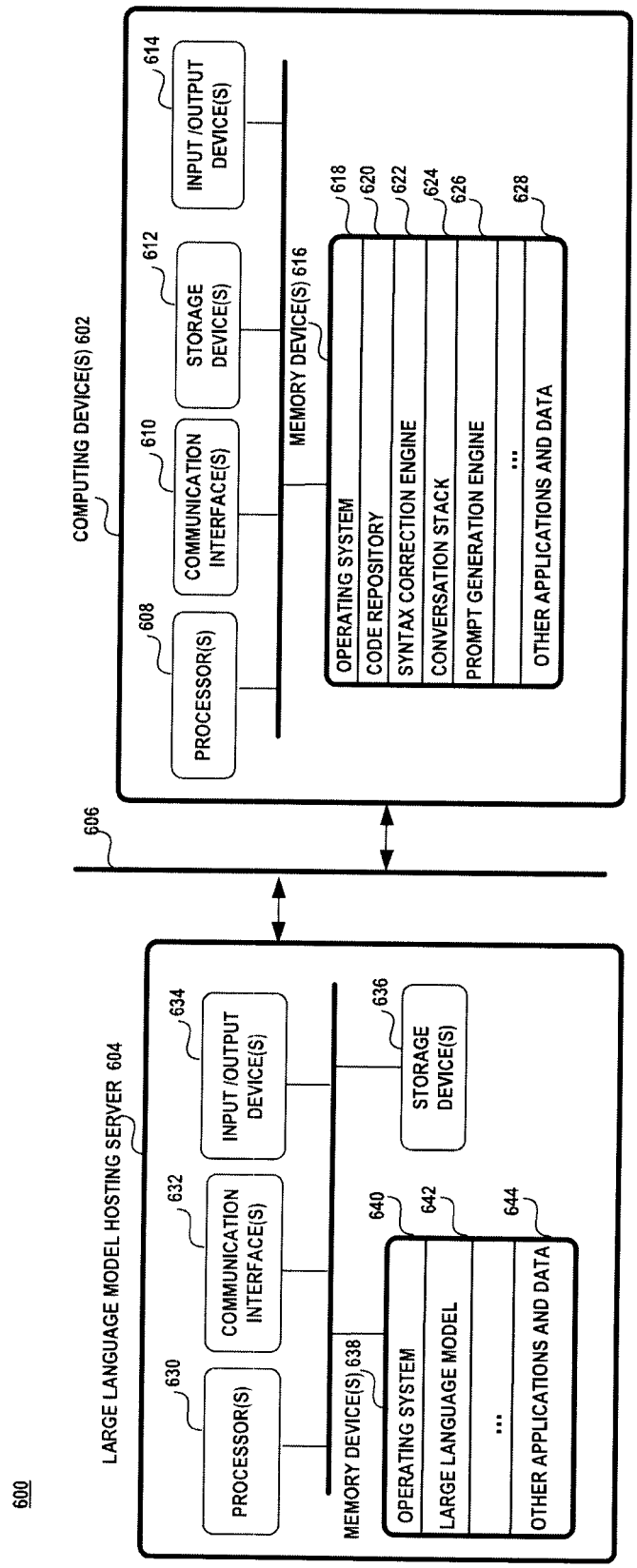
FIG. 6 is a block diagram illustrating an exemplary operating environment.

Attention now turns to a discussion of an exemplary operating environment. FIG. 6 illustrates an exemplary operating environment 600 in which one or more computing devices 602 are used to generate the prompt to the large language model and one or more computing devices 604 are used to host the large language model which uses the prompt to predict a response. However, it should be noted that the aspects disclosed herein are not constrained to any particular configuration of devices. In another aspect, a single computing device may host the large language model and the conversational test generation system.

A computing device 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 602, 604 may include one or more processors 608, 630, one or more communication interfaces 610, 632, one or more storage devices 612, 632, one or more input/output devices 614, 634, and one or more memory devices 616, 638. A processor 608, 630 may be any commercially available or customized processor and may include dual microprocessors and multi-processor architectures. A communication interface 610, 632 facilitates wired or wireless communications between the computing device 602, 604 and other devices. A storage device 612, 636 may be a computer-readable medium that does not contain propagating signals, such as modulated data signals transmitted through a carrier wave. Examples of a storage device 612, 636 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612 in a computing device 602, 604. The input/output devices 614, 634 may include a keyboard, mouse, pen, voice input device, touch input device, display, speakers, printers, etc., and any combination thereof.

A memory device or memory 616, 638 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 616, 638 may also include one or more external storage devices or remotely located storage devices that do not pertain to propagated signals, such as modulated data signals transmitted through a carrier wave.

The memory device 616, 638 may contain instructions, components, and data. A component is a software program that performs a specific function and is otherwise known as a module, program, component, and/or application. The memory device 616 may include an operating system 618, a code repository 620, syntax correction engine 622, conversation stack 624, prompt generation engine 626 and other applications and data 628. Memory device 638 may include an operating system 640, the large language model 642, and other applications and data 644.

A computing device 602 may be communicatively coupled via a network 606. The network 606 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of generating unit tests for a change to a file of a code repository. The technical features associated with addressing this problem is the ordered sequence of prompts, constructed as a conversation to a large language model, for the model to generate the unit tests. The technical effect achieved is the accuracy in the generation of the unit tests without undue increased computational burden.

One of ordinary skill in the art understands that the technical effects are the purpose of a technical embodiment. The mere fact that a calculation is involved in an embodiment does not remove the presence of the technical effects or alter the concrete and technical nature of the embodiments. Operations used to create the prompts and the interactions with the large language model are understood herein as inherently digital. The human mind cannot interface directly with a CPU or network interface card, or other processor, or with RAM or other digital storage, to read or write the necessary data and perform the necessary operations on digital values in the manner disclosed herein.

The embodiments are also presumed to be capable of operating at scale, within tight timing constraints in production environments, or in testing labs for production environments as opposed to being mere thought experiments.

CONCLUSION

A system is disclosed, comprising: one or more processors; and a memory that stores one or more programs that are configured to be executed by the one or more processors. The one or more programs including instructions to perform acts that: access a large language model trained on source code and natural language to perform a task given a prompt; detect a change to a file from a pull request of a code repository, wherein the change is not associated with a unit test; construct a first prompt for the large language model to predict a location to incorporate the unit test, wherein the first prompt includes a structure of the code repository; apply the first prompt to the large language model; and when the large language model indicates an existing file as the location to incorporate the unit test: construct a second prompt for the large language model to generate edits to the existing file that add the unit test to the existing file, wherein the second prompt includes contents of the existing file; apply the second prompt to the large language model; obtain from the large language model, the edits; and incorporate the edits into the existing file.

In an aspect, the structure of the code repository includes a directory of the changed file, a parent directory of the directory of the changed file, a subdirectory of the directory of the changed file, and/or a directory having a pathname that includes a test keyword. In an aspect, the one or more programs including instructions to perform acts that: prioritize contents of the first prompt and/or the second prompt to reduce the contents of the first prompt and/or second prompt to fit into a context window size of the large language model. In an aspect, the one or more programs including instructions to perform acts that: check code of the existing file with the edits for a syntax error; and correct the syntax error.

In an aspect, the second prompt includes a format for the edits to the existing file, wherein the format includes update commands that insert lines before or after a line of the existing file and replace a span of lines of the existing file with replaced content. In an aspect, the one or more programs include instructions to perform acts that: when the large language model indicates a new file as the location to incorporate the unit test: construct a third prompt for the large language model to generate content of the unit test; apply the third prompt to the large language model; and obtain from the large language model, the unit test.

In an aspect, the one or more programs include instructions to perform acts that: prior to the construction of the third prompt: construct a fourth prompt for the large language model to compare contents of a comparison file to learn to generate the unit test, wherein the fourth prompt includes the contents of the comparison file; and apply the fourth prompt to the large language model. In an aspect, the large language model is a neural transformer model with attention.

A computer-implemented method is disclosed, comprising: accessing a large language model trained on source code and natural language to perform a task given a prompt; receiving a change to a file from a pull request of a code repository, wherein the change is not associated with a unit test; creating a first prompt for the large language model to predict a location to incorporate the unit test, wherein the first prompt includes a structure of the code repository and the changed file; receiving from the large language model the location of the unit test given the first prompt; and when the large language model indicates a new file as the location for the unit test: creating a second prompt for the large language model to generate the unit test, wherein the second prompt includes the first prompt; and receiving from the large language model the unit test given the second prompt.

In an aspect, the computer-implemented method further comprises: prior to creating the second prompt for the large language model to generate the unit test: creating a third prompt for the large language model to select a comparison file for the generation of the unit test, wherein the third prompt includes the first prompt and the second prompt; and receiving a name of the selected comparison file from application of the third prompt to the large language model.

In an aspect, the computer-implemented method further comprises: creating a fourth prompt for the large language model to generate the unit test given the selected comparison file, wherein the fourth prompt includes the third prompt; and receiving the unit test from application of the fourth prompt to the large language model.

In an aspect, the computer-implemented method further comprises: reducing size of the fourth prompt to fit within a context window size of the large language model by prioritizing lines of the selected comparison file to include in the fourth prompt. In an aspect, the computer-implemented method further comprises: checking for syntax errors in the unit test generated by the large language model; and upon detecting a syntax error, correcting the syntax error. In an aspect, the computer-implemented method further comprises: reducing size of the first prompt to fit within a context window size of the large language model by prioritizing directories of the structure of the code repository to include into the first prompt. In an aspect, the large language model is a neural transformer model with attention.

A computer-implemented method is disclosed, comprising: accessing a large language model trained on source code and natural language to generate a unit test for a change to a file from a pull request of a code repository; creating an ordered sequence of prompts for the large language model to generate the unit test, wherein a prompt includes an instruction to perform a task and an answer format, wherein a subsequent prompt in the ordered sequence includes a previous prompt in the ordered sequence, wherein a first prompt of the ordered sequence includes a first instruction for the large language model to determine whether the change to the file from the pull request is testworthy, wherein a second prompt of the ordered sequence includes a second instruction for the large language model to determine a location to incorporate the unit test in the code repository, wherein a third prompt of the ordered sequence includes a third instruction for the large language model to generate contents of the unit test relative to the determined location; applying each prompt of the ordered sequence serially to the large language model; and obtaining, from the large language model, a response to each prompt.

In an aspect, the second prompt includes a structure of the code repository. In an aspect, the determined location is an existing file in the code repository, and the third prompt includes contents of the existing file. In an aspect, the third prompt includes an answer format, the answer format includes update commands that represent edits to the existing file that add the unit test. In an aspect, the computer-implemented method further comprises: applying the edits to the existing file; checking for syntax correctness of the existing file having the edits; and correcting for syntax errors in the existing file having the edits.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
   one or more processors; and
   a memory that stores one or more programs that are configured to be executed by the one or more processors, the one or more programs comprising instructions to perform acts that:
   access a large language model trained on source code and natural language to generate source and/or natural language given a prompt;
   detect a change to a file from a pull request of a code repository, wherein the change is not associated with a unit test;
   construct a first prompt for the large language model to generate a location in the code repository to incorporate a first unit test to test the change to the file from the pull request of the code repository, wherein the first prompt comprises a structure of the code repository;
   cause the large language model to generate a location to incorporate the first unit test given the first prompt;
   when the large language model indicates an existing file in the code repository as the location to incorporate the first unit test:
   construct a second prompt for the large language model to generate edits to the existing file that add the first unit test to the existing file, wherein the second prompt comprises contents of the existing file in the code repository;
   cause the large language model to generate the edits given the second prompt; and
   incorporate the edits into the existing file; and
   when the large language model indicates a new file in the code repository as the location to incorporate the first unit test:
   obtain a comparison test file from the code repository;
   cause the large language model to generate a new test file given the comparison test file and the change to the file from the pull request; and
   place the new test file into the code repository.

2. The system of claim 1, wherein the structure of the code repository includes a directory of the changed file, a parent directory of the directory of the changed file, a subdirectory of the directory of the changed file, and/or a directory having a pathname that includes a test keyword.

3. The system of claim 2, wherein the one or more programs comprise instructions to perform acts that:
   prioritize contents of the first prompt and/or the second prompt to reduce the contents of the first prompt and/or second prompt to fit into a context window size of the large language model.

4. The system of claim 1, wherein the one or more programs comprise instructions to perform acts that:
   check syntax of the source code of the existing file with the edits; and
   if a syntax error is found, correct the syntax error.

5. The system of claim 1, wherein the second prompt includes a format for the edits to the existing file, wherein the format includes update commands that insert lines before or after a line of the existing file and replace a span of lines of the existing file with replaced content.

6. The system of claim 1, wherein detect a change to a file from a pull request of a code repository comprises instructions to perform act that: determine whether the change to the file is testworthy.

7. The system of claim 6, wherein the one or more programs include comprise instructions to perform acts that:
   cause the large language model to determine whether the change to the file is testworthy given the change to the file.

8. The system of claim 1, wherein the large language model is a neural transformer model with attention.

9. A computer-implemented method, comprising:
   accessing a large language model trained on source code and natural language to generate source code and/or natural language given a prompt;
   receiving a change to a file from a pull request of a code repository, wherein the change is not associated with a unit test;
   creating a first prompt for the large language model to predict a location to incorporate the unit test for the change to the file from the pull request in the code repository, wherein the first prompt includes a structure of the code repository and the changed file;

causing the large language model to generate the location given the first prompt;

receiving from the large language model the location of the unit test;

when the large language model indicates a new file as the location for the unit test:
- creating a second prompt for the large language model to generate the unit test, wherein the second prompt includes the first prompt and a comparison test file from the code repository;
- causing the large language model to generate the unit test given the change to the file from the pull request;
- receiving from the large language model the unit test given the second prompt; and
- placing the new file into the code repository; and when the large language model indicates an existing file in the code repository as the location for the unit test:
- causing the large language model to generate the edits to the existing file given contents of the existing file in the code repository; and
- incorporating the edits into the existing file.

10. The computer-implemented method of claim 9, further comprising:
prior to creating the first prompt, determining whether the change to the file is testworthy.

11. The computer-implemented method of claim 10, further comprising:
causing the large language model to determine whether the change to the file is testworthy given the change to the file.

12. The computer-implemented method of claim 11, further comprising:
reducing size of the fourth prompt to fit within a context window size of the large language model by prioritizing lines of the selected comparison file to include in the fourth prompt.

13. The computer-implemented method of claim 9, further comprising:
checking for syntax errors in the unit test generated by the large language model; and
upon detecting a syntax error, correcting the syntax error.

14. The computer-implemented method of claim 9, further comprising:
reducing size of the first prompt to fit within a context window size of the large language model by prioritizing directories of the structure of the code repository to include into the first prompt.

15. The computer-implemented method of claim 9, wherein the large language model is a neural transformer model with attention.

16. A computer-implemented method, comprising:
accessing a large language model trained on source code and natural language to generate a unit test for a change to a file from a pull request of a code repository;
creating an ordered sequence of prompts for the large language model to generate the unit test, wherein a prompt includes an instruction to perform a task and an answer format, wherein a subsequent prompt in the ordered sequence includes a previous prompt in the ordered sequence, wherein a first prompt of the ordered sequence includes a first instruction for the large language model to determine whether the change to the file from the pull request is testworthy, wherein a second prompt of the ordered sequence includes a second instruction for the large language model to determine a location to incorporate the unit test in the code repository, wherein a third prompt of the ordered sequence includes a third instruction for the large language model to generate contents of the unit test relative to the determined location;
applying each prompt of the ordered sequence serially to the large language model;
obtaining, from the large language model, a response to each prompt; and
upon receiving a response to the third prompt, storing the unit test in the location in the code repository.

17. The computer-implemented method of claim 16, wherein the second prompt includes a structure of the code repository.

18. The computer-implemented method of claim 16,
wherein the determined location is an existing file in the code repository, and
wherein the third prompt includes contents of the existing file.

19. The computer-implemented method of claim 18,
wherein the third prompt includes an answer format, the answer format includes update commands that represent edits to the existing file that add the unit test.

20. The computer-implemented method of claim 19, further comprising:
applying the edits to the existing file;
checking for syntax correctness of the existing file having the edits; and
correcting for syntax errors in the existing file having the edits.

\* \* \* \* \*